July 24, 1956
J. W. GRATIAN ET AL
2,756,276
MEANS FOR SENSING MAGNETIC FLUX
Filed Feb. 18, 1953
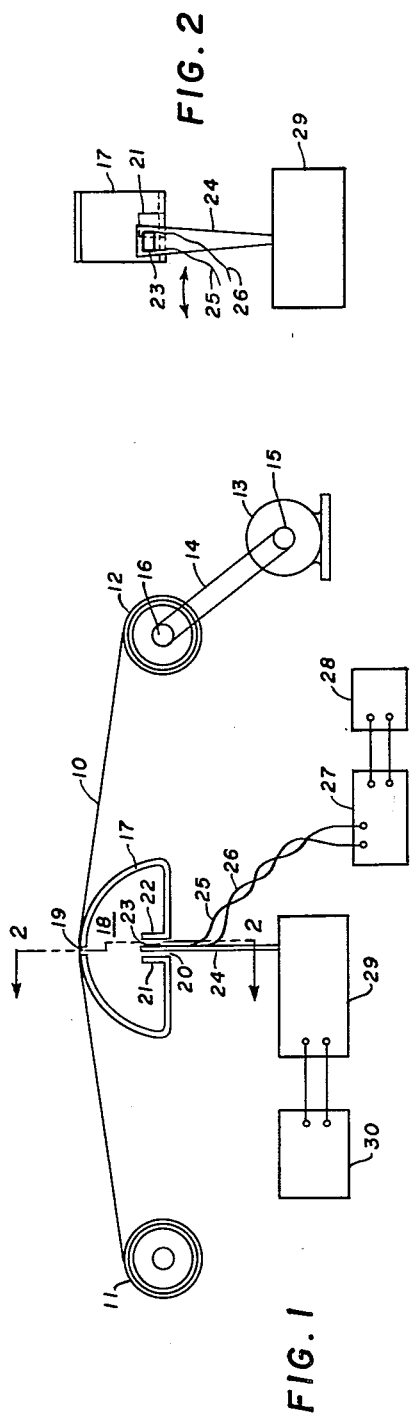
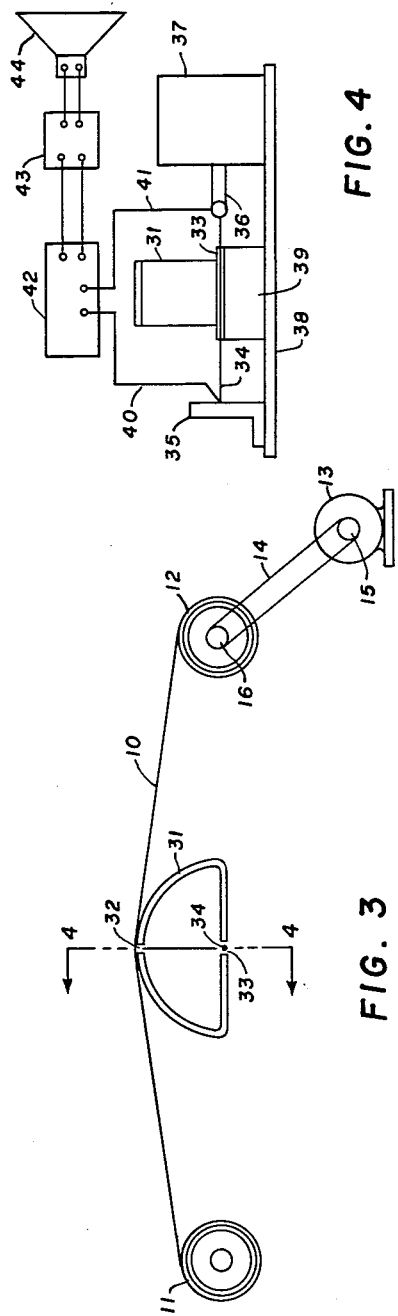
INVENTORS.
JOSEPH W. GRATIAN
LYNN C. HOLMES
BY
THEIR AGENT

United States Patent Office 2,756,276
Patented July 24, 1956

2,756,276

MEANS FOR SENSING MAGNETIC FLUX

Joseph W. Gratian, Rochester, and Lynn C. Holmes, Fairport, N. Y., assignors, by mesne assignments, to General Dynamics Corporation, a corporation of Delaware Application February 18, 1953, Serial No. 337,632

6 Claims. (Cl. 179—100.2)

Our invention relates to means for, and a method of, sensing flux in a magnetic field, and is particularly adapted to use as a magnetic-recording pickup head.

Conventional methods of sensing flux have not provided satisfactory sensitivity where field intensities are small. It is therefore an object of our invention to provide a means of, and a method for, sensing flux in a magnetic field which affords high sensitivity.

It is also an object of our invention to provide a magnetic-recording pickup means having an extended low frequency response.

Further objects and advantages of our invention will become apparent as the following description proceeds and the features of novelty which characterize our invention will be pointed out with particularity in the claims annexed to and forming a part of this specification.

For a better understanding of our invention, reference may be had to the accompanying drawing in which Fig. 1 shows one embodiment of our invention for use as a magnetic recording pickup head;

Fig. 2 is a section helpful in understanding Fig. 1;

Fig. 3 shows another embodiment of our invention for use as a magnetic-recording pickup head; and Fig. 4 is a sectional view helpful in understanding Fig. 3.

In general, our method of sensing flux in a magnetic field comprises the steps of placing part of a conductive loop, such as a pickup coil, in the magnetic field to be sensed; connecting the loop to a utilization device; and continuously vibrating the loop. It is preferable to vibrate the loop at substantially constant amplitude and frequency. As a result of the vibration, a voltage which is proportional to the strength of the magnetic field is induced in the loop. The induced voltage is an alternating voltage which can be measured by any convenient means, or may be utilized in any fashion desired. For example, if the magnetic field is derived from a magnetic-recording medium, such as a magnetic-recording tape, the voltage induced in the coil comprises an alternating voltage modulated in accordance with the variations in magnetic field strength recorded along the tape. The induced voltage may be demodulated in a demodulator to obtain a voltage corresponding to the recorded signals. The demodulated voltage may then be amplified and converted into audible sound by a loudspeaker.

Fig. 1 illustrates how our invention may be used to sense flux derived from a magnetic-recording medium. A magnetic-recording medium 10 is continuously unwound from storage reel 11 onto take-up reel 12 by means of a motor 13 driving belt 14 over pulleys 15 and 16. The core 17 of the magnetic recording head 18 is oriented relative to medium 10 such that a first airgap 19 formed in said core is positioned for flux pickup from medium 10. Core 17 is preferably of the strip type disclosed and claimed in a copending application of Joseph W. Gratian, Serial Number 335,502, filed February 6, 1953, now Patent No. 2,725,430, granted November 29, 1955, and assigned to the assignee of the present invention.

Flux from medium 10 is picked up in the first, or magnetic-recording, airgap 19. Some flux appears in a second airgap 20. Airgap 20 may be defined by bent-up portions 21 and 22; these preferably extend across only a fraction of the width of core 17, as shown.

A pickup coil 23 is supported on the second airgap 20, as by means of support 24. Coil 23 is positioned as indicated in Fig. 2, that is, with a portion only of its area in airgap 20. The leads 25 and 26 of coil 23 may be connected to any desired utilization device. In Fig. 1, leads 25 and 26 are connected to the primary of an impedance matching transformer 27. The secondary of the transformer 27 is connected to a convenient indicating means, such as vacuum tube voltmeter 28.

Support 24 is arranged to be vibrated back and forth by any convenient means. Such a means may be a crystal cutting head 29 driven from an oscillator 30. The frequency and amplitude of voltage from oscillator 30 is not critical, although it is desirable that these quantities be constant, so that the amplitude and frequency of the vibration of coil 23 are also substantially constant.

From the foregoing explanation, it is clear that the flux from medium 10 which appears in airgap 20 is cut by vibration of pickup coil 23. The amplitude of the voltage induced by the relative motion between coil 23 and the field in airgap 20 is proportional to the frequency and amplitude of vibration; but if these quantities are constant, the magnitude of the induced voltage depends only on the strength of the field.

A second embodiment of our invention is shown in Fig. 3. As in the arrangement of Fig. 1, a magnetic-recording medium 10 is unwound from storage reel 11 onto take-up reel 12, the latter being driven by an electric motor 13 through belt 14 which passes over pulleys 15 and 16. A core 31 is provided with a first, or magnetic-recording pickup, airgap 32 and a second airgap 33. As indicated more clearly in Fig. 4, which is a sectional view taken along line 4—4 in Fig. 3, the pickup means is a taut wire, 34. Wire 34 is stretched between a point on bracket 35 and a point on vibratory arm 36 of a convenient vibratory mechanism, such as crystal driver 37. The body of crystal driver 37 comprises a reaction member which takes the reaction of the vibrations of member 36. Bracket 35 and the reaction member, or body, of crystal driver 37 are supported by any convenient means, such as platform 38. A built-up portion 39 on platform 38 supports core 31 in a position which allows wire 34 to cut flux transferred by core 31 to second airgap 33.

The alternating voltage induced in wire 34 as a result of vibration in airgap 33 may be connected via leads 40 and 41 to utilization means. The latter may comprise a demodulator 42 and an amplifier 43 of conventional design. Amplifier 42 is in turn connected to a loudspeaker 44 or other suitable transducer. The details of demodulator 42, amplifier 43 and transducer 44 have not been shown since their nature is well understood by those skilled in the art. The same is true of crystal driver 37. As those skilled in the art are aware, wire 34 and connecting leads 40 and 41 form a conductive loop. In practicing our invention, it is necessary only that a portion of the conductive loop thus formed be present in the magnetic field of the second airgap. It is, of course, not necessary that the field to be measured or to be utilized be derived from a magnetic-recording medium; our invention is in fact useful wherever it is necessary to measure the relative strength of magnetic fields, particularly when these fields are weak.

While we have shown and described our invention as applied to a specific embodiment thereof, other modifications will readily occur to those skilled in the art. We do not, therefore, desire our invention to be limited to the specific arrangement shown and described, and we intend in the appended claims to cover all modifications within the spirit and scope of our invention.

What we claim is:

1. In an arrangement for sensing flux in a magnetic field, the combination of a pickup coil; vibratory means operating at substantially constant amplitude and frequency; means supporting said coil on said vibratory means; means supporting a portion only of said coil in said field; and means operatively connected to said coil for utilizing the voltage induced in said coil as a result of vibration thereof in said field.

2. In a means for sensing flux in a magnetic field, the combination of a transducer having a vibratory member, said transducer operating to convert electric oscillations into vibrations of said member and having a reaction member for suspending said vibratory member; a source of electric oscillations for said transducer; means for supporting said reaction member of said transducer; a taut wire stretched between a point on said support means and said vibratory member, said wire being oriented to cut the flux of said magnetic field; and means operatively connected to said wire for utilizing the voltage induced in said pickup means as a result of vibration in said field.

3. In a magnetic-recording reproducing head for converting a pattern of magnetic variations on a constantly-transported longitudinal magnetic recording medium into variations in an electric current, the combination of a core of generally looped configuration having a first and a second airgap in series therewith, said core being oriented with said first airgap adjacent said magnetic recording medium; pickup means disposed in said second airgap and oriented to cut the flux therein; means for continuously vibrating, at substantially constant amplitude and frequency, said pickup means in said second airgap, whereby there is generated in said pickup means a voltage whose magnitude varies in accordance with the flux reaching said second airgap from said magnetic recording medium.

4. In a magnetic-recording reproducing head for converting a pattern of magnetic variations on a constantly-transported longitudinal magnetic recording medium into variations in an electric current, the combination of a core of generally looped configuration having a first and a second airgap in series therewith, said core being oriented with said first airgap adjacent said magnetic recording medium; a pickup coil disposed in said second airgap and oriented to have a portion thereof cut the flux therein; a transducer having a vibratory member, said transducer operating to convert electric oscillations into vibrations of said member; and a source of electric oscillations for said transducer, said pickup coil being mechanically coupled for vibration to said vibratory member, whereby there is generated in said pickup coil a voltage whose magnitude varies in accordance with the flux reaching said second airgap from said magnetic recording medium.

5. In a magnetic-recording reproducing head for converting a pattern of magnetic variations on a constantly-transported longitudinal magnetic recording medium into variations in an elcetric current, the combination of a core of generally looped configuration having a first and a second airgap in series therewith, said core being oriented with said first airgap adjacent said magnetic recording medium; a transducer having a vibratory member, said transducer operating to convert electric oscillations into vibrations of said member and having a reaction member for suspending said vibratory member; a source of electric oscillations for said transducer; means for supporting said reaction member of said transducer; and pickup means extending between a point on said supporting means and said vibratory member, said pickup means being oriented to have a portion thereof cut the flux in said second airgap, whereby there is generated in said pickup means a voltage whose magnitude varies in accordance with flux reaching said second airgap from said magnetic recording medium.

6. The combination of claim 5 in which said pickup means comprises a taut wire stretched between said point on said supporting means and said vibratory member.

References Cited in the file of this patent

UNITED STATES PATENTS

| | | |
|---|---|---|
| 2,123,045 | Hoare | July 5, 1938 |
| 2,420,580 | Antes | May 13, 1947 |
| 2,423,339 | Newman | July 1, 1947 |
| 2,424,295 | Williams | July 22, 1947 |
| 2,451,819 | Frosch | Oct. 19, 1948 |
| 2,512,015 | Graveel | June 20, 1950 |
| 2,517,975 | Chapin | Aug. 8, 1950 |
| 2,556,199 | Lee | June 12, 1951 |
| 2,587,593 | Camras | Mar. 4, 1952 |
| 2,617,854 | Valkenburg | Nov. 11, 1952 |